Patented Jan. 10, 1933

1,894,113

UNITED STATES PATENT OFFICE

PHILIP S. MILLER, OF SCOTIA, NEW YORK, ASSIGNOR TO GENERAL ELECTRIC COMPANY, A CORPORATION OF NEW YORK

MANGANESE RESINATE

No Drawing.   Application filed June 20, 1929.   Serial No. 372,537.

The present invention comprises an improved resinate of manganese.

Prior to my invention commercial resinates have been obtainable in two forms, namely, a so-called "fused resinate" which was made by a thermal reaction between a manganese compound and rosin and a so-called "precipitated resinate" which was prepared by a process involving a double decomposition reaction in an aqueous solution. The fused resinate as heretofore obtainable contained manganese up to about 3½% by weight. The precipitated resinate, which is very much more expensive, contains higher percentages of manganese, say up to about 7½% or 8% by weight. The low manganese fused resinate is soluble in mineral oil but the precipitated resinate is nearly insoluble.

It is desirable for some purposes to provide a resinate of high metal content which is soluble in mineral oil. For example, in the process of reclaiming mineral oil which has been contaminated by use as described in VanBrunt Patent 1,703,647 of February 26, 1929, it is desirable to add to the oil a resin of high metal content as a preliminary step to the coagulation and precipitation of impurities by the addition of water glass.

I have discovered that fused manganese resinate containing manganese to the extent of about 4½% to 5% by weight, or even higher, can be produced in a form highly soluble in mineral oil by the employment of a reaction temperature which is maintained within a predetermined range for a predetermined length of time.

The following specific example of the preparation of manganese resinate is illustrative of my invention.

For a yield of approximately 100 pounds of manganese resinate about 148 pounds of rosin (preferably the "F" grade) are melted and carefully raised to a temperature of about 250° C. This fusion and heating step should occupy about 40 minutes. When the temperature of the fused rosin has reached 250° C. about 9 pounds of dry manganese dioxide are slowly added by sifting the dry oxide of manganese into the solution without stirring. About 25 to 30 minutes should be taken for the addition of the oxide and the temperature should be allowed to slowly rise to 300° C. at the end of the period of oxide addition. The fusion is stirred for 5 minutes and the temperature is then held at 310 to 315° C. until the reaction is complete. This last period of heating usually requires about 40 to 60 minutes. The melt is then rapidly cooled to stop further reaction, as by pouring into a shallow pan to a depth not to exceed two inches.

The resulting resinate composition which has a manganese content of about 4.5 to 5% by weight may be used as a so-called drier for varnish compositions or may be added to mineral oil (preferably of medium viscosity) together with palmitic acid preliminary to the purification of used mineral oil. It is soluble in mineral oil to the extent of about 20% by weight. The presence of palmitic acid in the mineral oil markedly increases the solvent action of the oil on the resinate.

What I claim as new and desire to secure by Letters Patent of the United States, is:

1. A composition of manganese and rosin containing at least about 4.5% to 5% by weight of combined manganese, reacted at 300 to 315° C. and being soluble in mineral oil.

2. The method of preparing a compound of manganese and rosin which consists in heating rosin and oxide of manganese in contact with one another at a temperature of 300 to 315° C. in proportions yielding a compound containing about 4.5% to 5% of manganese until reaction is complete and then rapidly cooling to a temperature at which reaction ceases.

In witness whereof I have hereunto set my hand this 18th day of June, 1929.

PHILIP S. MILLER.